W. A. COOK.
BOTTOMING TAP.
APPLICATION FILED FEB. 12, 1917.
1,296,627.
Patented Mar. 11, 1919.
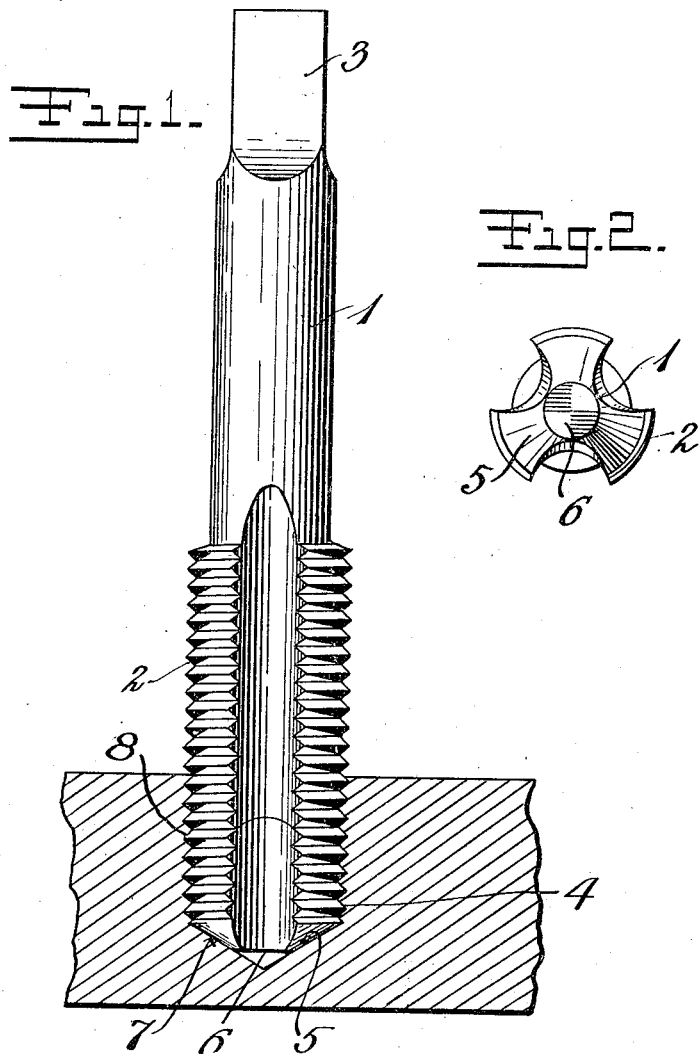
Inventor
Wallace A. Cook
By his Attorney

UNITED STATES PATENT OFFICE.

WALLACE A. COOK, OF GREENFIELD, MASSACHUSETTS, ASSIGNOR TO GREENFIELD TAP AND DIE CORPORATION, OF GREENFIELD, MASSACHUSETTS.

BOTTOMING-TAP.

1,296,627.

Specification of Letters Patent.   Patented Mar. 11, 1919.

Application filed February 12, 1917.   Serial No. 148,117.

*To all whom it may concern:*

Be it known that I, WALLACE A. COOK, a citizen of the United States of America, residing at Greenfield, Franklin county, Massachusetts, have invented new and useful Improvements in Bottoming-Taps, of which the following is a specification.

My invention relates to taps of the type known as bottoming taps or plug taps, and used for screw-threading all the way to the bottom the walls of holes that do not pass completely through the material in which they exist, which may conveniently be termed blind holes. In this class of work it is customary for the workman to ascertain when the thread has been cut completely to the bottom of the walls of the hole by the "feel" or increased resistance to turning which the tap meets as the bottom is neared. This is rather an indefinite guide inasmuch as the resistance met in tapping different holes, or even at different depths of the same hole, varies considerably with the result that the workman, in order to be sure that he has reached the bottom, frequently exerts too much force and breaks off the cutting edges of the end teeth of the tool or tap.

Particularly is this likely to occur in the case of drilled holes, and in machine work most of the holes that are to be tapped are first drilled. This is so because the drill is usually formed with a conical end on which the cutting edges are located; so that the bottoms of such holes below the cylindrical walls are conically depressed. Thus the increase in resistance at the moment that the first cutting edge of the tap leaves the wall and starts to cut the outer part of the bottom of the hole, is not so great as to be perceived with certainty by the workman, and broken cutting teeth are frequent.

My invention consists in the construction of tap herein described, illustrated, and claimed, which overcomes the difficulties above set forth.

In the accompanying drawing, in which similar reference characters designate corresponding parts in all figures, I have shown a tap embodying my invention. In these drawings, Figure 1 is an elevation of the tap, showing it in position in a hole at the completion of the tapping operation, the material in which the hole is formed being shown in a section through the axis of the hole; and Fig. 2 is a plan view of the bottom end of the tap.

In these drawings, 1 designates the shank of the tap upon which are formed the usual cutting teeth 2, and means, such as a squared end 3, for attachment of an operating handle. At the lower end of the tap the first few cutting teeth may be chamfered as at 4.

The central part of the shank extends axially beyond the cutting teeth at the lower or forward end, and is provided with a smooth bearing surface 5 preferably beveled or conical in shape to correspond exactly with the taper 7 of the bottom of a hole 8, and preferably having the apex flattened as at 6. The disposition of this bearing surface 5 with respect to the cutting teeth 2 is such that the surface seats upon the bottom of the hole being tapped at precisely the moment that the first of the cutting teeth reaches the bottom of the wall of the hole.

Having now described my invention, I claim and desire to secure by Letters Patent:

A tap for cutting a full thread to the bottom of the wall of a blind hole having a conically depressed bottom, comprising a shank having cutting teeth near one end and a forwardly projecting conical surface at said end so disposed as to seat on the bottom of the hole when the foremost cutting tooth reaches the bottom of the wall.

In testimony whereof I have signed my name to this specification.

WALLACE A. COOK.

Copies of this patent may be obtained for five cents each, by addressing the "Commissioner of Patents, Washington, D. C."